Patented Jan. 29, 1946

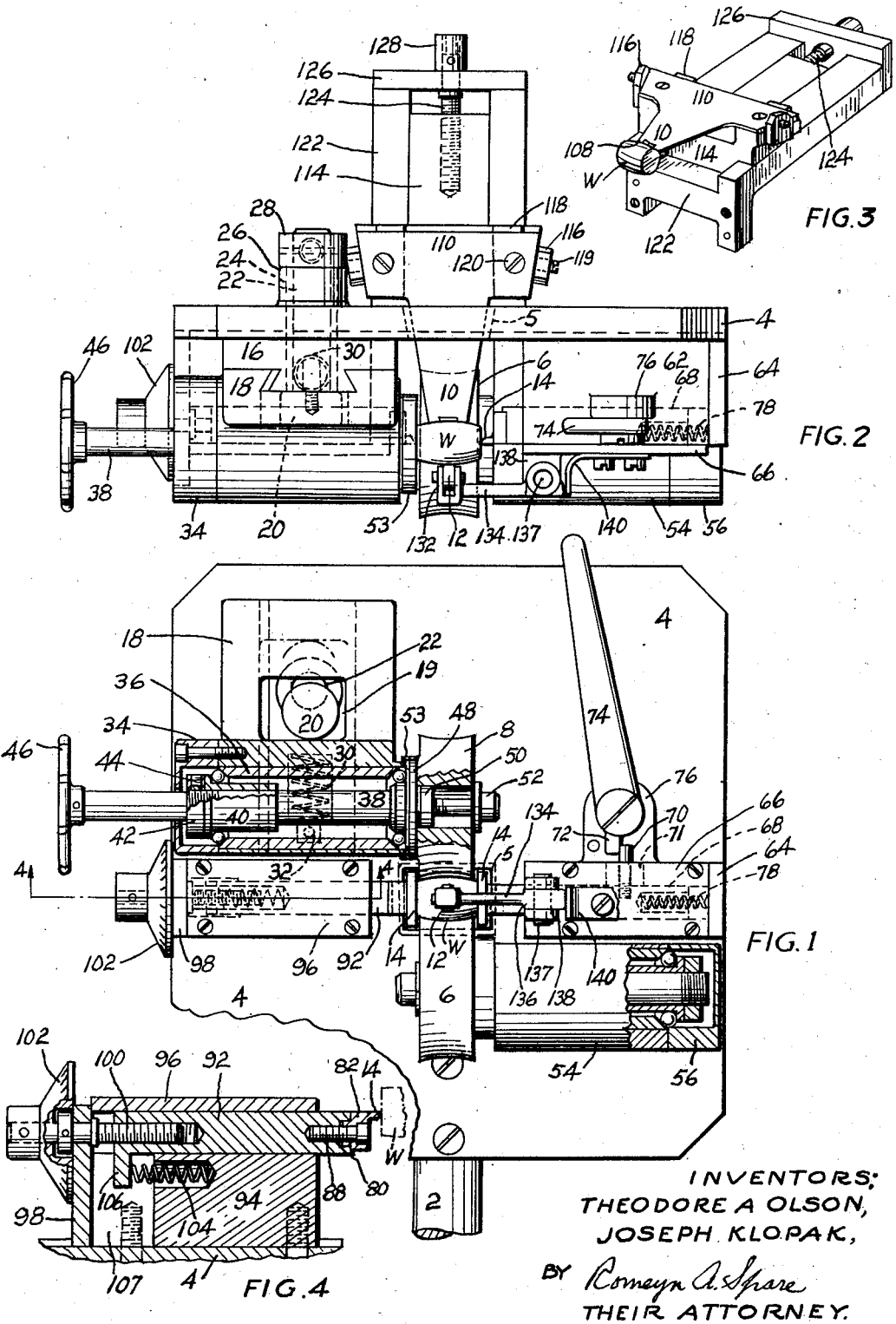
Jan. 29, 1946. T. A. OLSON ET AL 2,393,705
INSPECTION OF ARTICLES, ESPECIALLY ANTIFRICTION BEARING PARTS
Filed Aug. 7, 1942 2 Sheets-Sheet 1
INVENTORS:
THEODORE A OLSON,
JOSEPH KLOPAK,
BY Romeyn A. Spare
THEIR ATTORNEY.

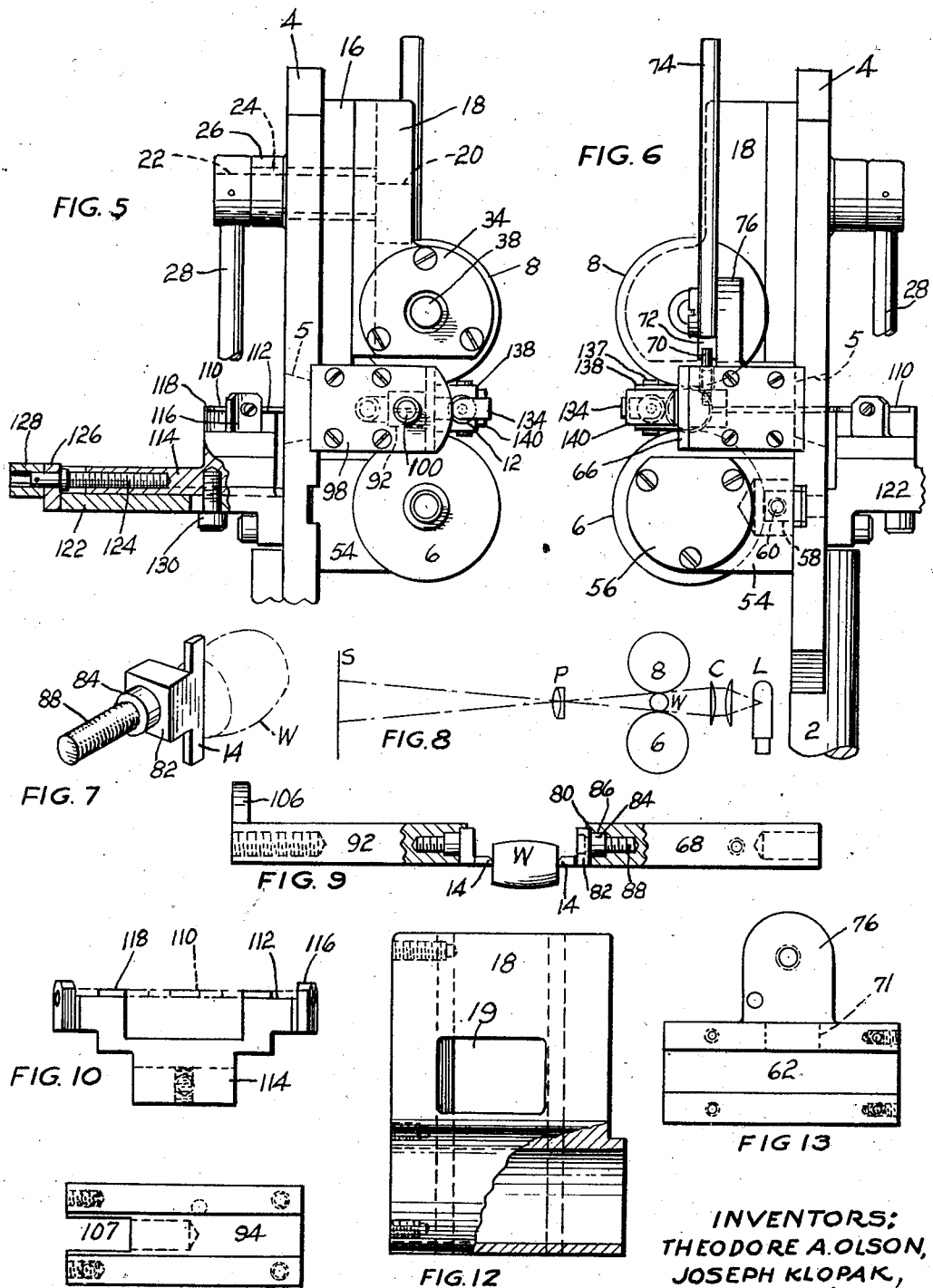

2,393,705

UNITED STATES PATENT OFFICE 2,393,705

INSPECTION OF ARTICLES, ESPECIALLY ANTIFRICTION BEARING PARTS

Theodore A. Olson, Pompton Plains, and Joseph Klopak, Newark, N. J., assignors to General Motors Corporation, Detroit, Mich., a corporation of Delaware Application August 7, 1942, Serial No. 454,054

15 Claims. (Cl. 88—24)

This invention relates to the inspection of articles, especially antifriction bearing parts, and comprises all of the features and aspects of novelty herein disclosed. Modern antifriction bearings are built with great precision. Correct sizes, accurate contours and correct location of engaging parts are among the things that are very important to good performance and endurance of bearings. The machine herein shown, though not confined to such use, is particularly adapted to inspect bearing rollers which are curved or contoured lengthwise, such as barrel shaped rollers. These rollers have flat end faces which should be parallel to each other and perpendicular to the roller axis for best co-operation with the bearing separator while the peripheral surface, which is a surface of revolution generated by an arc revolved about an axis, should be accurately formed and located to best co-operate with similarly shaped bearing raceways. Usually, but not always, the maximum cross sectional diameter of the roller is midway between the end faces of the roller. The present machine simultaneously inspects the contour of the peripheral surface and the end-squareness of the end faces.

An object of the invention, accordingly, is to provide an improved machine and method for inspecting contours of articles, especially rollers of antifriction bearings. Another object is to provide an improved machine for inspecting the shape or condition of the end faces of such rollers. Another object is to provide a machine which will make readily and clearly evident any departure of these surfaces from an acceptable form, as by throwing magnified and lighted images of the discrepancies on a screen for observation.

To these ends and to improve generally upon devices of this character, the invention consists in the various matters hereinafter described and claimed. In its broader aspects, the invention is not necessarily limited to the specific machine selected for illustrative purposes in the accompanying drawings in which:

Fig. 1 is a front elevation with some parts broken away and in section.

Fig. 2 is a plan view, the upper gauging wheel being removed.

Fig. 3 is an isometric view of a back stop and its support.

Fig. 4 is an enlarged sectional view taken on line 4—4 of Fig. 1.

Fig. 5 is a left hand view with some parts in section.

Fig. 6 is a right hand view.

Fig. 7 is a detail enlarged view of a blade and its holder.

Fig. 8 is a diagram of the optical system.

Fig. 9 is a plan view of the blades and their slides in gauging relation to a work piece.

Fig. 10 is a front view of a slide for the back stop.

Fig. 11 is a front view of a guide block.

Fig. 12 is a front view, broken away and in section, of a housing slide.

Fig. 13 is a front view of a guide block.

A round upright post 2 is slabbed off at the top and fastened by screws to a barrier or supporting plate 4 which occupies a vertical plane. The plate is substantially imperforate except for fastening devices and has a central slot 5 to allow light to pass through from the sides and ends of the article or work piece W herein shown as a barrel-shaped roller. The work is supported between a lower gauging wheel 6 which is an idler and an upper gauging wheel 8 which can be manually rotated as well as vertically adjusted. These wheels are concave and have slightly different radii of curvature so that one constitutes a maximum master and the other a minimum master. The wheel axes are parallel. The work piece rests at the rear against the edge of a backstop 10 against which it is urged by a pressure roller 12 so that the axis of the work lies in the plane of the wheel axes. At the ends of the work piece are opposed plates or blades 14 which are vertically elongated and movable towards or from the ends of the work by slides. The blades are parallel to one another and perpendicular to the axes of the wheels. Light from a source L passes through condenser lenses C which direct the rays towards the outline of the work and substantially tangentially of the wheels. If there are any small spaces beyond the outline, the light goes to a projection lens P which throws magnified and lighted images of the spaces upon a screen S at a distance.

The upper wheel is supported and adjusted as follows. A dove-tailed guide plate 16 is fastened by screws to the front of the supporting plate and vertically guides a housing-carrying slide 18, the latter having a slot 19 to receive an eccentric cam 20 on the front end of a cam shaft 22 which is journalled in a bushing 24 supported by the guide plate, by the supporting plate, and by a boss 26 at the rear of the supporting plate. On the rear or outer end of the shaft is pinned a collar having a handle 28 so that the cam can be actuated to raise the slide. A coil spring 30 urges the slide downwardly by reaction between a counterbore in the guide plate 16 and a stud 32 fastened to the slide 18.

The enlarged housing portion of the slide 18 is closed at the outer or left end by a flanged end cap 34, this cap engaging the end of a sleeve 36 which is angled off at the ends to form angular contact raceways engaging two series of balls, one set riding on an enlarged cylindrical portion of a rotary spindle 38 and the other set of balls having two point contact with an angular race sleeve 40 fitting on the spindle and adjustably secured by a threaded collar 42 which is locked in adjusted position by a soft shoe backed up by a set screw 44. The outer end of the spindle has a knob 46 by which it is manually turned. The upper wheel 8 rests at its left side against a flange 48 on the spindle and is centered by a cylindrical pilot 50, the wheel being clamped in position by a washer and a screw 52. To keep grit from the housing, a shield 53 surrounds the flange 48 and a little arcuate projection on the spindle housing.

The mounting for the lower wheel 6 is similar to that of the upper wheel but this wheel merely has idle rotation by contact with the work instead of being positively turned. The wheel spindle is mounted by ball bearings in a spindle housing 54 having a cap 56. The spindle housing is fastened to the supporting plate 4 by screws and has a little tongue projecting into a groove of the supporting plate to locate it. A headed stud 58 is fastened in a socket of the spindle housing by a clamping screw 60 and has a press fit in the supporting plate.

The right hand blade support and slide is mounted just above the spindle housing 54. The mounting comprises a grooved guide block 62 whose groove is closed at the right hand end by an end closure plate 64 and closed at the front by a front plate 66. Sliding in the groove is a slide 68 which is substantially square in cross section, the slide having a pin 70 projecting upwardly therefrom through a slot 71 in the guide block where it is engaged by a lug 72 on a lever 74 which is pivoted on an upward extension or lug 76 of the guide block. A light coil spring 78 reacts between the end plate 64 and the bottom of a counterbore in the slide to urge the blade towards the work.

The two blades are similarly supported on their slides. At the projecting left end of the slide 68 is a little lip 80 which locates a straight vertical surface on a blade body or carrier 82 having a round extension 84 fitting in a socket 86 in the slide and fastened by a headed screw 88. The blade 14 is offset forwardly from the center of the blade carrier 82 and presents a sharp vertical edge to the end of the work in a vertical central plane thereof. At the opposite end of the work the left hand blade is mounted in a similar manner on a slide 92 which is guided in a groove on a guide block 94 which is fastened to the supporting plate 4. The guide block has a front cover 96 and an end closure plate 98. For fine adjustment of this slide under manual control, a screw 100 is threaded into the slide and is journalled for rotation without endwise movement in the end plate 98, a dial 102 being fastened to the outer end of the screw. A coil spring 104 reacts between the bottom of a counterbore in the guide block and a lug 106 which projects rearwardly from the slide into a notch 107 of the guide block 94.

The backstop 10 against which the work rests at the rear is substantially T-shaped and projects through the slot 5 in the supporting plate 4. The front edge 108 of the backstop where it engages the work is centrally recessed with the ends curved to fit the contour of the work. An enlarged head 110 on the backstop rests upon a pair of spaced platforms 112 raised up from a slide 114, the space between providing for passage of the light rays between the work and the lower wheel. The head 110 fits between side lugs 116 on the slide 114 and is located endwise by little lips 118 at the rear of each platform. Set screws 119 are threaded in the lugs 116 to adjust the head 110. The head of the backstop is fastened down on the platform 112 by screws 120. The slide 114 is adjustable horizontally in a groove on the top of a grooved guide bracket 122 fastened to the back of the supporting plate 4 by screws. Threaded into the rear end of the slide is an adjusting screw 124 journaled for rotation without endwise movement in a plate 126 fastened to the rear end of the guide bracket, a sleeve 128 being pinned to the outer end of the screw and having a socket for an adjusting tool. After the slide is adjusted, it is clamped in fixed position by a vertical screw 130 projecting up through a slot in the guide bracket. The blade 10 locates the work piece with its axis in the vertical plane of the wheel axes in which plane also lie the edges of the blades 14.

In order to urge the work against the backstop, the pressure roller 12 is mounted to rotate freely on a horizontal pin joining a pair of ears 132 formed on an arm 134 whose hub 136 is pivoted on a vertical pivot pin 137 supported by ears 138 on the front plate 66, the hub of the arm having a little projection engaged by an angled leaf spring 140 which is fastened on the front plate 66.

The two wheels 6 and 8 are master gauge wheels which are concave when the work is convex. One wheel, such as 8, has a radius of curvature axially which represents the maximum acceptable radius axially of a work piece. The other wheel has a radius of curvature axially which is slightly smaller than that of the first wheel and represents the minimum acceptable radius for the axially curved surface of the work piece. If the radius of the axially curved surface of the work fits either wheel or lies between the radii of the two wheels, the piece is within the allowable tolerances. The condition is shown at a glance by the enlarged light streaks on the screen, these streaks being magnified images of the space or spaces between the work and the wheels. No high power light source or great magnification is needed. A 100 watt light source and a magnification of 5 is sufficient to give clear and sharp definition. Extraneous light is excluded in any suitable way from the space between the supporting plate 4 and the screen S.

In operation, with the wheel 8 raised and the blades 14 retracted, a work piece is placed on the lower wheel 6 against the back stop 10, the pressure wheel 12 being swung out if necessary to facilitate admission of the piece. The pressure wheel 12 thereafter urges the piece crosswise against the back stop and the wheel 8 is lowered onto the piece and manually rotated. This rotates the work and the lower wheel 6, the reaction between the concavo-convex engaging surfaces of the work and the wheels causing the work to find and take its own center lengthwise so that its maximum diameter lies in the vertical plane through the minimum diameters of the concave wheels. The right hand blade 14 engages the work with such a light pressure that it will not interfere with this centering and the geometric center of the work and its axis maintaining a definite position with respect to the wheels. Next the left hand blade 14 is advanced by the screw 100 and dial 102 until the blade just touches the other end face of the work. This touching can be felt and can occur without displacing the work endwise. With the work correctly positioned and rotating in mating relation to the wheels, the magnified images of the light streaks between the work and the wheels are observed and the surface contour thereby inspected. Also any light which passes between the end faces of the work and the vertical blades 14 indicates the condition of such end faces, as to whether they are parallel to each other and perpendicular to the axis of the work. Any unacceptable departure is indicated by a wabbling gob of light at one or both ends of the piece. This wabbling is due to the fact that, if either end face is oblique to the work axis, the vertical blade will have point contact with such face at different points in a vertical plane as the piece rotates. The left hand blade cannot shift but the right hand blade will yield or advance to maintain contact with the piece. The allowable degree of obliquity or lack of end-squareness is very small but can be very readily detected.

The machine is readily adaptable for inspecting other sizes and shapes of work. For instance, the back stop 10 can be replaced by another or its locating edge can be adjusted rearwardly for larger work by actuating the slide 114. The wheels 6 and 8 are replaceable with others of different contours or radii. Besides convex articles, concave, straight, tapered or irregular shapes can be quickly and easily inspected by the use of suitable work engaging members arranged and operated in an analogous manner.

We claim:

1. In a machine for inspecting a revoluble article for surface contour, a pair of contoured gauging members spaced apart to receive the article between them, the longitudinal contours of the members representing maximum and minimum acceptable contours for the article, at least one of said members being a rotatable wheel, a spindle to rotate the wheel and thereby rotate the article on its axis, means for supporting the article for rotation with its axis located and maintained in a definite relation to the axis of the rotatably driven wheel, means for directing light through any spaces existing between the surface of the article and the gauging members, and means for making the transmitted light indicate the shape of said spaces as the article rotates.

2. In a machine for inspecting a revoluble article for surface contour, a pair of contoured gauging wheels engaging diametrically opposite sides of the article, the peripheral surfaces of the wheels having longitudinal contours representing maximum and minimum acceptable contours for the article, means to rotate at least one of the wheels to cause rotation of the article about its axis, means for locating the article endwise and crosswise to support it for rotation with its axis maintained in a definite relation to the wheels, a source of light, means for directing light through any spaces existing between the surface of the article and the gauging wheels, and means for making the transmitted light indicate the shape of said spaces.

3. In a machine for inspecting an article for surface contour, a pair of contoured gauging members engaging opposite sides of the article, the members being shaped to conform to maximum and minimum acceptable article contours, at least one of the members being a rotatable wheel to rotate the article about its axis, a spindle for rotatably driving the wheel, a stop for locating the article crosswise of its axis, a spring pressed member urging the article against the stop, means for directing light through any spaces existing between the article and the gauging members, and means for making the transmitted light indicate the shape of said spaces.

4. In a machine for inspecting a rotatable article for surface contour, a pair of contoured gauging wheels mounted for rotation on parallel axes, the peripheral surfaces of the wheels being surfaces of revolution longitudinally shaped to conform to maximum and minimum acceptable article contours, means for locating the article for rotation with its surface in mating relation to said wheels and with its axis in the plane of the wheel axes, means for rotating at least one of the wheels to cause rotation of the article on its axis, and means for producing for observation an image of any space existing between the article and the gauging wheels.

5. In a machine for inspecting the sides and ends of an article, a pair of contoured gauging members engaging opposite sides of the article, a pair of end gauging members engaging the ends of the article, all of said members being arranged to make contact with the article in a common plane, means for directing light substantially perpendicular to said plane and through any spaces existing between the article and the gauging members, and means for producing for observation magnified images of any such spaces.

6. In a machine for inspecting the relation of the end face of a round article to its axis, means for supporting the article by its peripheral surface, a blade perpendicular to the axis and adapted to engage the end face, means for directing light through any space existing between the end face and the blade, and means for making the transmitted light indicate in magnified form the shape of such space.

7. In a machine for inspecting a rotatable article, means for supporting and rotating the article on its axis, a blade extending across the axis and adapted to engage an end face of the article as the article rotates, means for yieldingly urging the blade and the end face into contact, and means for causing any changing relation of the end face to the blade to be visible as the article rotates.

8. In a machine for inspecting a rotatable article, means for supporting and rotating the article on its axis, a pair of blades engaging the end faces of the article, means for directing light through any spaces existing between said end faces and the blades, and means for making the transmitted light indicate in magnified form the condition of said end faces.

9. In a machine for inspecting a rotatable article, means for supporting and rotating the article on its axis, a pair of parallel blades perpendicular to said axis of rotation and arranged to engage the end faces of the article, means for directing light through any spaces existing between the end faces of the article and the blades, and means for making the transmitted light indicate whether said end faces are perpendicular to the axis of the article.

10. In a machine for inspecting a rotatable article, a pair of parallel blades perpendicular to the axis of the article, means for moving said blades into contact with the end faces of the article, one of said blades being yieldable, means for rotating the article on its axis, and means for indicating by relative movement between the end faces and the blades whether said end faces are perpendicular to said axis.

11. In a machine for inspecting a rotatable article for the longitudinal curvature of its surface, a master gauging wheel having its peripheral surface longitudinally curved to conform to an acceptable article contour, means for supporting the article for rotation in mating contact with the gauging wheel and with its axis parallel to the wheel axis, means for rotating the wheel to turn the article about its axis, and means for producing for observation a magnified image of any space existing between the surface of the article and the surface of the wheel.

12. In a machine for inspecting an article whose peripheral surface of revolution is curved longitudinally, a pair of gauging members similarly curved longitudinally to engage opposite sides of the article, the engaging surfaces of the gauging members and the article being concavo-convex, means for holding the article from movement crosswise of its axis, at least one of the gauging members being a rotatable wheel, means for rotating the wheel to rotate the article on its axis, means for moving one gauging member towards the other to make the concavo-convex engaging surfaces react on each other and thereby cause the article to center itself axially and maintain a fixed axial position during its rotation, and means for producing for observation an image of any space existing between the surface of the article and the surface of a gauging member.

13. In a machine for inspecting an article whose peripheral surface of revolution is curved longitudinally, a master gauging wheel whose peripheral surface is curved longitudinally to conform to an acceptable article contour, the engaging surfaces of the wheel and the article being concavo-convex, means for supporting the article for rotation and holding it from movement crosswise of its axis, means for rotating the wheel to rotate the article about its axis, means for causing pressure between the rotating wheel and the rotating article to make the concavo-convex engaging surfaces react on each other to center the article axially, and means for producing for observation an image of any space existing between the surface of the article and the surface of the wheel.

14. In a machine for inspecting the end face of a round article whose peripheral surface of revolution is curved longitudinally, a pair of wheels similarly curved longitudinally and engaging opposite sides of the article, means for holding the article from movement crosswise of its axis, means for rotating at least one of the wheels to rotate the article on its axis, a gauging blade perpendicular to the article axis and engaging the end face of the article as the article rotates, and means for producing for observation an image of any space existing between the end face of the article and the blade.

15. In a machine for inspecting the end face of a rotatable article, means for supporting and rotating the article on its axis with the geometric center of the article at a definite point, a gauging blade perpendicular to the article axis and engaging the end face as the article rotates, means for urging the blade against the end face, and means for directing light through any space existing between the end face and the blade to indicate whether such end face is perpendicular to the article axis.

THEODORE A. OLSON.
JOSEPH KLOPAK.